(12) United States Patent
Schöpp et al.

(10) Patent No.: US 6,727,606 B2
(45) Date of Patent: Apr. 27, 2004

(54) MULTIMEDIA SYSTEM WITH A HOUSING THAT OPERATIONALLY STORES A PLURALITY OF MULTIMEDIA MODULES

(75) Inventors: Harald Schöpp, Ettlingen (DE); Michael Becker, Philippsburg (DE); Joachim Kobinger, Remchingen-Singen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 09/859,227

(22) Filed: May 16, 2001

(65) Prior Publication Data

US 2002/0050384 A1 May 2, 2002

(30) Foreign Application Priority Data

May 18, 2000 (DE) ......................................... 100 24 126

(51) Int. Cl.[7] ................................................. B60L 1/00
(52) U.S. Cl. ........................ 307/149; 307/9.1; 307/10.1
(58) Field of Search ................................ 307/9.1–10.1, 307/149

(56) References Cited

U.S. PATENT DOCUMENTS

| | | | |
|---|---|---|---|
| 4,426,684 A | | 1/1984 | Sechet et al. ............... 364/900 |
| 5,289,378 A | | 2/1994 | Miller et al. ................ 364/424 |
| 5,546,273 A | | 8/1996 | Harris ........................ 361/697 |
| 5,889,337 A | * | 3/1999 | Ito et al. ..................... 307/10.1 |
| 5,909,357 A | * | 6/1999 | Orr ............................ 361/687 |
| 5,978,821 A | * | 11/1999 | Freeny ....................... 361/683 |
| 6,040,760 A | * | 3/2000 | Kataoka et al. ............ 307/10.2 |
| 6,107,929 A | * | 8/2000 | Amari ........................ 307/10.2 |
| 6,108,198 A | * | 8/2000 | Lin ............................ 312/223.1 |
| 6,130,727 A | * | 10/2000 | Toyozumi ................... 312/7.1 |
| 6,147,938 A | * | 11/2000 | Ogawa et al. ............... 369/12 |
| 6,195,670 B1 | * | 2/2001 | Freeny ....................... 361/683 |
| 2002/0050384 A1 | * | 5/2002 | Schopp et al. .............. 174/70 B |

FOREIGN PATENT DOCUMENTS

| | | | | |
|---|---|---|---|---|
| DE | 20 05 344 A1 | 9/1970 | | |
| DE | 31 04 630 A1 | 8/1982 | | |
| DE | 37 26 784 A1 | 2/1989 | | |
| DE | 42 01 657 | 10/1992 | | |
| WO | WO 97/02570 | * | 1/1997 | ........... G11B/33/12 |
| WO | WO 02/12023 | * | 2/2002 | ........... G11B/33/02 |

\* cited by examiner

Primary Examiner—Gregory J. Toatley, Jr.
(74) Attorney, Agent, or Firm—Gauthier & Connors LLP

(57) ABSTRACT

A multimedia system includes a housing having several shelves for receiving multimedia modules. Each module and each shelf is equipped with a plug connector element. The plug connector elements of the modules and of the shelves are compatible and are preferably designed as plugs and sockets. The plugs and the sockets can be designed in the same way so that each module can be plugged into each shelf, or they can be module-specific so that only a module designed for a particular shelf can be plugged into it. When a module is inserted into the shelf of the housing, the plugs are inserted into one another so that the module is now connected to the first bus line, which connects the plug connector elements of the shelves with one another. Over the second bus line other modules situated outside the housing or the rack can be connected to this first bus line. The first and the second bus line together form a common bus line, which is preferably designed as a ring line. With a multimedia system in a motor vehicle, the shelves of the housing or the rack are intended to receive for example a car radio, a cassette player, a CD player, a DVD player, a television receiver, a navigation system, a car telephone, or a handy, while a display apparatus and a control apparatus are situated on the dashboard, and loudspeakers are situated for example in the doors or at other suitable places.

19 Claims, 4 Drawing Sheets

MULTIMEDIA SYSTEM WITH A HOUSING THAT OPERATIONALLY STORES A PLURALITY OF MULTIMEDIA MODULES

BACKGROUND OF THE INVENTION

The present invention relates to the field of electronic systems, and in particular to electronic systems with a housing or rack having several shelves for receiving modules.

Modern motor vehicles typically have equipment such as a multimedia system. In addition to the traditional car radio, such multimedia systems can include a number of other modules such as a cassette player, CD player, DVD player, television receiver, navigation system, screen, loudspeaker boxes, and a car telephone with hands-free equipment, to mention only a few examples.

Multimedia systems installed in a motor vehicle have a configuration that is customized to accommodate the wishes of an individual customer. As a result, the installation of an individually-tailored multimedia system requires more time and labor than the installation of the same multimedia system in mass-produced motor vehicles. Subsequent modifications or upgrading of such a multimedia system are also time consuming and work-intensive tasks.

Therefore, there is a need for an electronic system such as a motor vehicle multimedia system that can be configured according to individual desires. The expenditure of time and labor to initially configure and upgrade such systems should be minimal.

SUMMARY OF THE INVENTION

In one aspect of the invention, an electronic system is disclosed. The electronic system includes a rack housing with a plurality of shelves each configured to receive a module, and a plurality of plug connector elements each located proximate to a corresponding shelf. Each plug connector element connects to a fitting plug connector element of a module plugged into a corresponding shelf. The plurality of plug connector elements are connected with each other through a first bus line, and the interconnected plug connector elements are connected to one or more modules external to the rack housing through a second bus line.

In another aspect of the invention, a rack housing is disclosed. The rack housing includes a frame defining exterior walls of the rack housing, the frame having an open front side and an open back side. A plurality of shelves are secured to an interior of the frame to define a plurality of compartments each configured to receive a module. A plug connector element is located proximate to a corresponding compartment to connect to a fitting plug connector element of a module plugged into the corresponding shelf. The plug connector elements are connected to each other through a first bus line, and the interconnected plug connector elements are connected to one or more modules external to the rack housing through a second bus line.

In a further aspect of the invention, a multimedia system for installation in a motor vehicle is disclosed. The multimedia system includes a housing configured with a plurality of compartments each adapted to receive a multimedia module, and a plurality of plug connector elements each secured to the housing adjacent to an associated compartment. Each plug connector is adapted to be electrically connected to a connector of a multimedia module installed in the corresponding compartment. A first bus line connects the plug connectors with one another, and is adapted to be connected to a second bus line capable of being connected to multimedia modules not installed in the housing.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
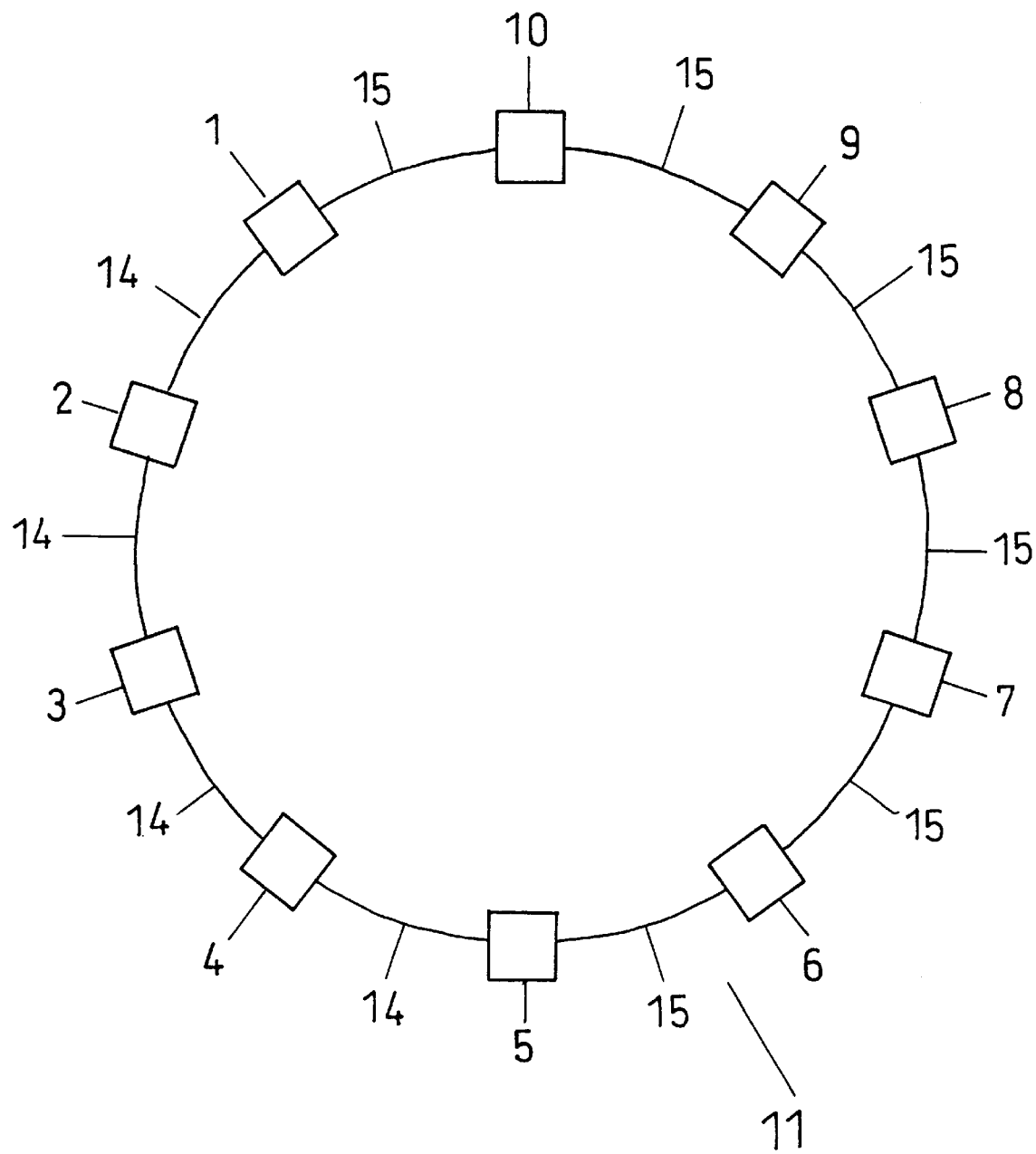
FIG. 1 illustrates a block diagram of an embodiment of the invention.

The present invention is directed to a multimedia system with a rack, frame or housing (collectively hereinafter "housing") having several shelves for receiving multimedia modules (hereinafter "modules"). FIG. 1 illustrates a block diagram of one embodiment of the multimedia system of the present invention. A car radio 1, a CD player 2, a DVD player 3, a cassette player 4, a navigation unit 5, a control apparatus 6, a display apparatus 7, loudspeakers 8 and 9, and a screen 10 are connected with one another through a bus line 11, which, for example, is an optical data bus, so as to form a ring network. The car radio 1, the CD player 2, the DVD player 3, the cassette player 4, and the navigation unit 5 are installed in the housing and are connected with one another through the first bus line 14. The control apparatus 6, the display apparatus 7, the loudspeakers 8 and 9, and the screen 10 are not installed in the housing, and are connected with one another through the second bus line 15. In addition, the second bus line 15 connects these external multimedia modules to the first bus line 14. Preferably, the two bus lines 14 and 15 are closed to form a ring line 11.

Figure 2:
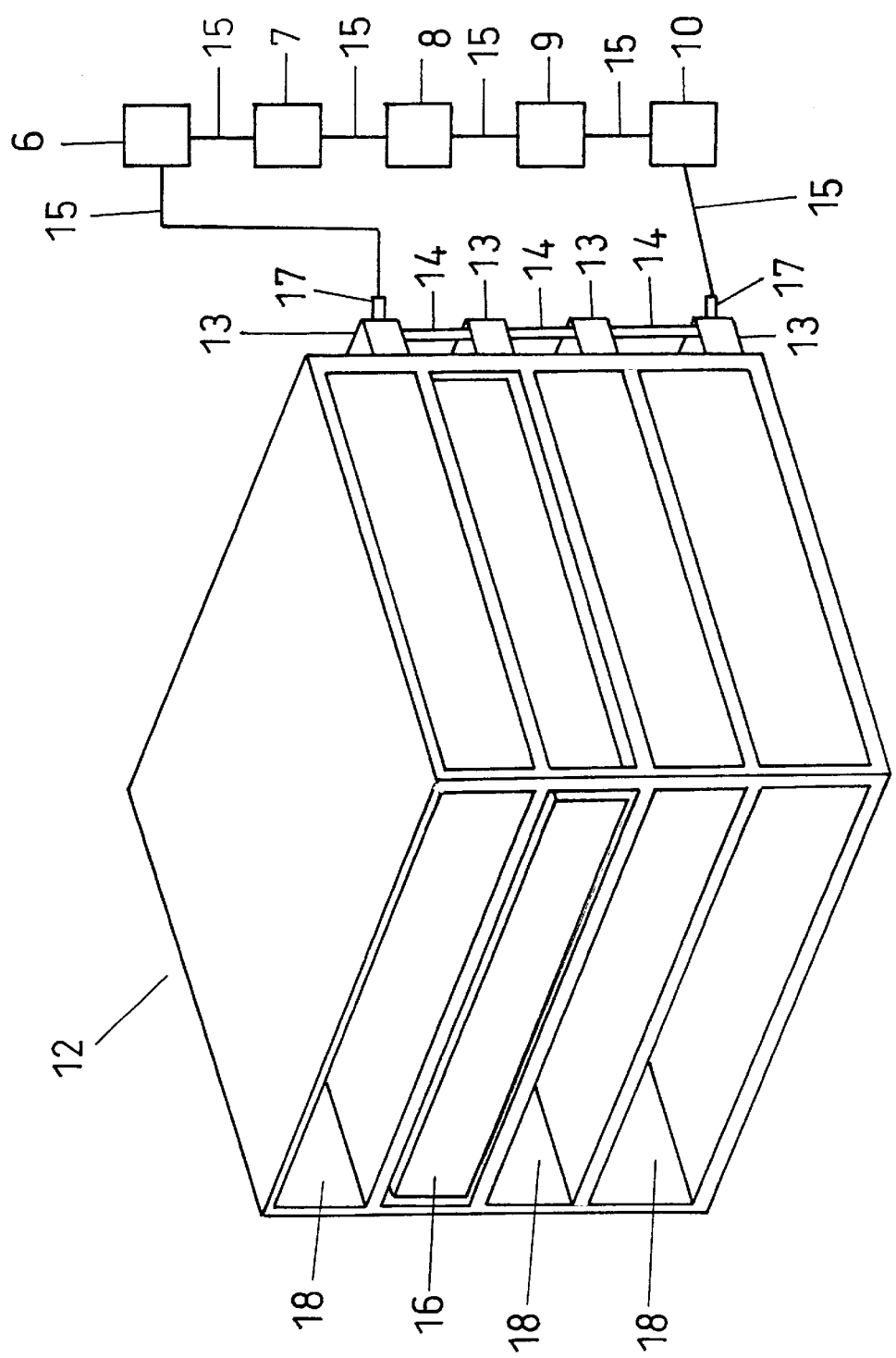
FIG. 2 illustrates a perspective view of a rack.

FIG. 2 is a perspective view of one embodiment of a housing in accordance with an aspect of the present invention. The housing 12, open on its front, has several shelves 18 to receive the modules. Thus, the individual modules are accommodated in the module compartments of the housing. Each module and each shelf is equipped with a plug connector element. At the backside of the rack 12, a plug connector element 13 is secured proximate to a corresponding shelf or compartment. The modules can be plugged into these plug connector elements 13. The plug connector elements 13 at the backside of the rack 12 are connected to one another through the first bus line 14. The second bus line 15 is connected to terminals 17, which connects modules not installed in the housing 12 to each other and to the modules that are installed in the housing 12. Such external modules include the control apparatus 6, the display apparatus 7, the loudspeakers 8 and 9, and the screen 10. In the illustrative example, the two bus lines 14 and 15 form the closed ring line 11. For the sake of clarity, housing 12 is illustrated with a module 16 that is installed in one compartment.

Figure 3:
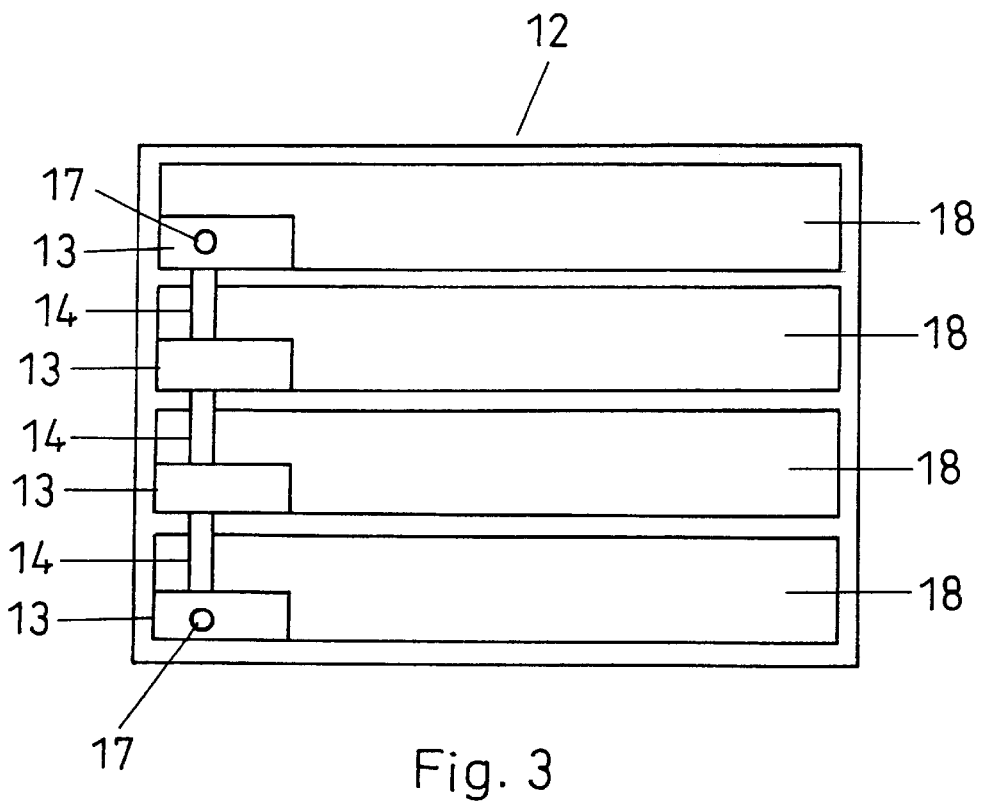
FIG. 3 illustrates the backside of the rack.
Figure 4:
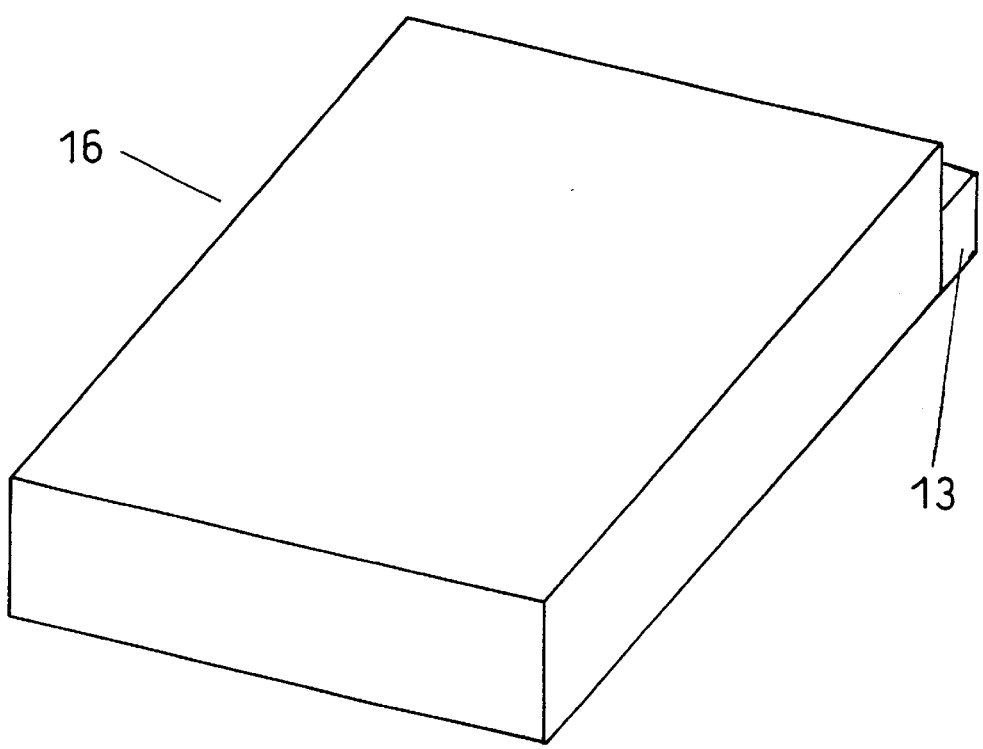
FIG. 4 illustrates a perspective view of a module that can be plugged into a shelf of the rack.

FIG. 3 illustrates the backside of the rack or housing 12. As already described a plug connector element 13 is secured to the housing 12 proximate to each compartment. It should be understood that the term "proximate" as used herein refers to any position of each plug connector element 13 relative to its corresponding compartment 18, such that the plug connector element 13 can be connected to a module 16 installed within that compartment 18. In an exemplary embodiment, each plug connector element 13 is secured to the rear of the housing 12 with its bottom surface resting on the top surface of the bottom platform defining the shelf or compartment 18. This is to accommodate the plug connector elements 13 of the modules 16 when the modules 16 are installed in the compartment 18. A perspective view of such a module 16 is illustrated in FIG. 4. It should be understood, however, that the plug connector elements 13 can be installed at other proximate locations relative to the corresponding compartment 18. For example, in one embodiment, the plug connector elements are secured to the exterior of the housing 12. In such an embodiment, the module connector element 13 extends through the rear surface of the housing 12 to connect to the plug connector elements 13. As noted and as shown in FIG. 3, the plug connector elements 13 are connected to one another through the first bus line 14. Two terminals 17 are situated at the first bus line 14 for connecting the second bus line.

Figure 5:
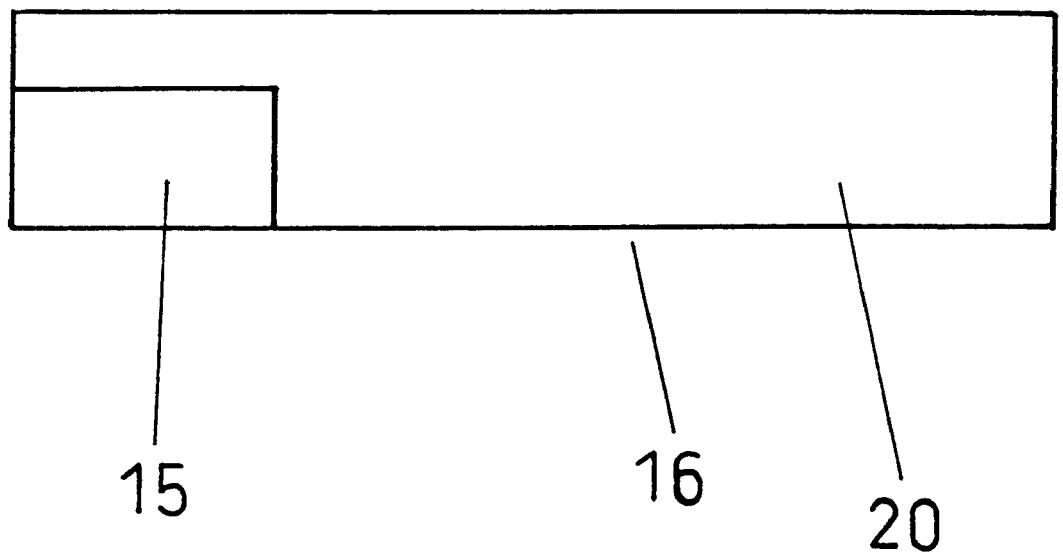
FIG. 5 illustrates the backside of the module.

FIG. 5 illustrates a backside 20 of the module 16. A plug connector element 15 is situated on the backside of the module 16. The plug connector elements can, for example, all be compatible with one another so any module can be plugged into any shelf. Alternatively, the plug connector element of each module can be compatible with the plug connector elements 13 secured proximate to each corresponding compartment designed to receive that module. In such an embodiment, certain modules may only be installed in only certain compartments. In a further embodiment, the plug connector elements can be designed module-specific so that only a module designed for a particular shelf or compartment can be plugged into it. In such an embodiment the plug of another module would not fit into the plug connector element associated with that compartment. Preferably, the plug connector elements of the modules and the shelves are designed as plugs and sockets, although any connector configuration can be used.

When a module 16 is inserted into the shelf 18 of the housing 12, the plug connector elements 13 of the modules and the plug connector elements of the housing 12 are connected to one another, so that the module 16 is connected to the first bus line 14, which connects the plug connector elements 13 of the shelves with one another. Over the second bus line 15, other modules 16, situated outside the housing or the rack, can be connected to this first bus line 14. The first and the second bus lines 14 and 15, as noted, can form a common bus line such as a ring line.

With a multimedia system in a motor vehicle, the rack 12 or the housing is preferably situated in the center console. Loading the rack with modules takes little time and little labor. Upgrades and modifications to the inventive multimedia system are likewise easy and quick, because the modules merely need to be replaced or new modules need to be inserted into unoccupied shelves.

With a multimedia system in a motor vehicle, the shelves of the housing or the rack are intended to receive for example a car radio, a cassette player, a CD player, a DVD player, a television receiver, a navigation system, a car telephone, or a handy, while a display apparatus and a control apparatus are situated on the dashboard, and loudspeakers are situated for example in the doors or at other suitable places.

When installing such a multimedia system, the modules intended for the rack consequently only need to be plugged into the shelves provided for them, while the second bus line to which the other modules are connected is connected to the first bus line, which connects the connecting elements of the housing or rack with one another, so as for example to complete a ring line.

When the multimedia system is modified, the modules plugged into the shelves are replaced by others; in the case of upgrading, unoccupied shelves are equipped with modules.

The present invention is especially suited for a multimedia system in a motor vehicle. However, the invention is certainly not limited to this particular application. It is generally suited for electronic systems with modules accommodated in a housing, and with modules situated outside the housing. As another example, it should be noted that the configuration of the housing 12 can take on different forms. For example, a closed housing can also be used in place of the open housing 12.

Although the present invention has been shown and described with respect to several preferred embodiments thereof, various changes, omissions and additions to the form and detail thereof, may be made therein, without departing from the spirit and scope of the invention.

What is claimed is:

1. An electronic system, comprising:
   a housing with a plurality of shelves each configured to receive a module; and
   a plurality of plug connector elements each located proximate to a corresponding one of said shelves to connect to a fitting plug connector element of a module plugged into said corresponding shelf,
   wherein said plurality of plug connector elements are connected with each other through a first bus line, and the interconnected plug connector elements are connected to one or more modules external to said housing through a second bus line; and
   a display associated with one of said modules external to said housing for displaying information received over said second bus line, wherein said first and second bus lines form a ring line.

2. The electronic system of claim 1, wherein ring line comprises an optical ring line.

3. The electronic system of claim 2, wherein said modules external to said housing comprise first and second loudspeakers connected said second bus line.

4. The electronic system of claim 1, wherein at least one of said plurality of plug connector elements is module-specific.

5. The electronic system of claim 1, wherein said plurality of plug connector elements have a same interface configuration and wherein said plurality of fitting plug connector elements have a same interface configuration, thereby enabling any of said modules to be plugged into any of said shelves.

6. The electronic system of claim 3, further comprising:
   a control apparatus connected to said second bus line.

7. The electronic system of claim 3, wherein one or more of said plurality of shelves and one or more of said corresponding plug connector elements are adapted to receive one or more modules that are multimedia units.

8. The electronic system of claim 1, wherein said housing is constructed and arranged to be installed in a motor vehicle.

9. The electronic system of claim 8, wherein said housing is constructed and arranged to be installed in a center console of a motor vehicle.

10. A housing for a multimedia system, comprising:

a frame defining exterior walls of the housing;

a plurality of shelves secured to an interior of said frame to define a plurality of compartments each configured to receive a module; and a plurality of plug connector elements each located proximate to a corresponding one of said shelves to connect to a fitting plug connector element of a module plugged into said corresponding shelf, wherein said plurality of plug connector elements are connected to a first bus line, and said interconnected plug connector elements are connected to one or more modules external to the housing through a second bus line; and a display associated with one of said modules external to said housing for displaying information received over said second bus line, wherein said first and second bus lines form a ring line.

11. The housing of claim 10, wherein said ring line comprises an optical ring line.

12. The housing of claim 11, wherein said modules external to said housing comprise a controller.

13. The housing of claim 10, wherein at least one of said plurality of plug connector elements is module-specific.

14. The housing of claim 10, wherein said plurality of plug connector elements have a same interface configuration and wherein said plurality of fitting plug connector elements have a same interface configuration, thereby enabling any module to be plugged into any shelf.

15. The housing of claim 13, wherein one or more of said plurality of shelves and one or more of said corresponding plug connector elements are adapted to receive one or more modules that are multimedia units.

16. The housing of claim 13, wherein the housing is constructed and arranged to be installed in a motor vehicle.

17. The housing of claim 16, wherein the housing is constructed and arranged to be installed in a center console of a motor vehicle.

18. A multimedia system for installation in a motor vehicle comprising:

a housing configured with a plurality of compartments each adapted to receive a multimedia module;

a plurality of first connectors each secured to said housing adjacent to an associated one of said plurality of compartments, and adapted to be electrically connected to a second connector of a multimedia module installed in the corresponding compartment; and a first bus line that connects said plurality of first connectors and is adapted to connect to a second bus line connected to multimedia modules not installed in the housing, a display associated with one of said multimedia modules not installed in the housing for displaying information received over said second bus line, wherein said first and second bus lines form a ring line.

19. The multimedia system of claim 18, wherein said multimedia modules located within said housing comprise a CD player and a radio, multimedia modules located outside said housing include loudspeakers.

* * * * *

UNITED STATES PATENT AND TRADEMARK OFFICE
CERTIFICATE OF CORRECTION

PATENT NO. : 6,727,606 B2
DATED : April 27, 2004
INVENTOR(S) : Schöpp et al.

It is certified that error appears in the above-identified patent and that said Letters Patent is hereby corrected as shown below:

<u>Column 4,</u>
Line 27, delete ",", insert -- ; and --.
Line 42, should read -- ...wherein said ring... --.

<u>Column 5,</u>
Line 5, delete ",", insert -- ; and --.

<u>Column 6,</u>
Line 16, delete ",", insert -- ; and --.
Line 20, should read -- ...in the housing ; and --.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,727,606 B2
DATED : April 27, 2004
INVENTOR(S) : Schöpp et al.

It is certified that error appears in the above-identified patent and that said Letters Patent is hereby corrected as shown below:

Column 4,
Line 27, delete "and" so line 27 reads "receive a module;"

Column 5,
Line 5, delete "and" so line 5 reads "to receive a module;"

Column 6,
Line 16, delete "and" so line 16 reads "in the corresponding compartment;"

Signed and Sealed this

Twenty-second Day of March, 2005

JON W. DUDAS
*Director of the United States Patent and Trademark Office*